United States Patent [19]

Wanser et al.

[11] Patent Number: 5,661,246

[45] Date of Patent: Aug. 26, 1997

[54] FIBER OPTIC DISPLACEMENT SENSOR FOR HIGH TEMPERATURE ENVIRONMENT

[76] Inventors: Keith H. Wanser, 26202 Escale Dr., Mission Viejo, Calif. 92691; Karl Friedrich Voss, 12716 87th Ct. NE, Kirkland, Wash. 98034

[21] Appl. No.: 625,203

[22] Filed: Apr. 1, 1996

[51] Int. Cl.⁶ .................................................. G01L 1/24
[52] U.S. Cl. ............................................ 73/800; 356/30
[58] Field of Search ........................... 356/30, 32; 73/790, 73/796, 797, 800, 826, 812

[56] References Cited

U.S. PATENT DOCUMENTS

| | | | |
|---|---|---|---|
| 3,075,160 | 1/1963 | Starr | 73/800 |
| 3,729,985 | 5/1973 | Sikorra | 73/812 |
| 4,279,164 | 7/1981 | Hawke et al. | 73/826 |
| 5,079,955 | 1/1992 | Eberhardt | 73/812 |
| 5,199,305 | 4/1993 | Smith et al. | 73/851 |
| 5,381,005 | 1/1995 | Chazelas et al. | 73/800 |

*Primary Examiner*—George M. Dombroske
*Assistant Examiner*—Max H. Noori
*Attorney, Agent, or Firm*—Leonard Tachner

[57] ABSTRACT

An assembly which allows use of Fiber Optic Displacement Sensors in a high-temperature environment. The package described is protected against harsh environments. Provisions are taken to allow averaging strains over distances of at least ½ to 4 feet, and to allow installation in cramped spaces. A rod is attached to an underlying surface at one point and guided to move in a selected direction of measurement. The distance between a selected movable location on the rod and a point fixed on the surface, is measured using a bent optical fiber having light loss characteristics dependent on that distance. The fiber is gold coated and the holders, guides and other hardware are enclosed in heat shielding trays in which a plurality of sensors are positioned at selected locations along a steam pipe, boiler, vessel or other surface.

24 Claims, 10 Drawing Sheets

FIBER OPTIC DISPLACEMENT SENSOR FOR HIGH TEMPERATURE ENVIRONMENT

BACKGROUND OF THE INVENTION

1. Field of the Invention

The present invention relates generally to the field of strain sensors and more specifically to fiber optic strain sensors designed to withstand high temperatures and to be installed in harsh, cramped environments.

2. Prior Art

Strain sensors are currently used in numerous applications; however, it is difficult to build sensors that will survive at elevated temperatures and in hostile environments over a wide sensing range. The enclosed assembly permits one to accurately measure strains at operating steam power plants and the like. The invention permits installation to be performed under adverse condition inside cramped spaces. No known prior art provides these features.

SUMMARY OF THE INVENTION

Fiber displacement sensors are used to measure displacements averaged over long distances using extension rods that are temperature matched to the structure to be measured and kept in thermal equilibrium with this structure by ensuring a maximal contact and good thermal shielding. Fibers are protected against harsh chemicals by coating them with a thin (approximately 10 μm) layer of gold. The boundary conditions needed for the proper operation of the sensor are met by using high-temperature epoxy to secure the fiber within protective jackets. The sensitivity of the system decreases by only about 30% when changing the environmental temperature from room temperature to 1200 degrees Fahrenheit. The system can be interrogated both in transmission and reflection modes. For example, in the reflection mode one can use an optical time domain reflectometer (OPDR).

In a preferred embodiment of the invention, an extension rod is firmly connected to a holder. The rod can move with respect to a guide which only allows motion of the rod in the direction in which strain is to be measured. A rider is mounted at a distance from the guide on the rod. If the distance between the holder and the guide changes due to strain changes in the structure, this change is reflected as a change in the length of that portion of the rod between the guide and the rider. The sensor then measures the distance between the guide and the rider. Care has to be taken to ensure that the system is protected and in good thermal contact with the structure to which it is attached.

The fiber optic sensors operate on the principle of curvature loss in bent fibers. The sensors take advantage of the specific shape that the fiber assumes upon changing the distance between the two attachment points. Reproducibility is assured by requiring that the boundary conditions of the holders of the fibers are well defined. This also allows mathematical modeling of the shape that the fiber assumes. We have found that the largest contributions to the change in both transmission and reflection originate in the regions of smallest bend radii and fastest change of bend radii.

OBJECTS OF THE INVENTION

It is a principal object of the present invention to provide a strain sensor capable of operating at temperatures at least as high as 1200 degrees Farenheit and/or corrosive environments.

It is another object of the invention to provide a strain sensor which can be easily installed on site for measuring the strain of high temperature fluid-carrying pipes, boilers, vessels and the like and has low thermal apparent strain.

It is still another object of the invention to provide a strain sensor system which may be used to measure strain of an underlying surface along a plurality of distinct locations under conditions of high temperature corrosive environments and cramped space.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 3, comprising

FIG. 6, comprising

FIG. 7, comprising

FIG. 8, comprising

DETAILED DESCRIPTION OF A PREFERRED EMBODIMENT

Figure 1:
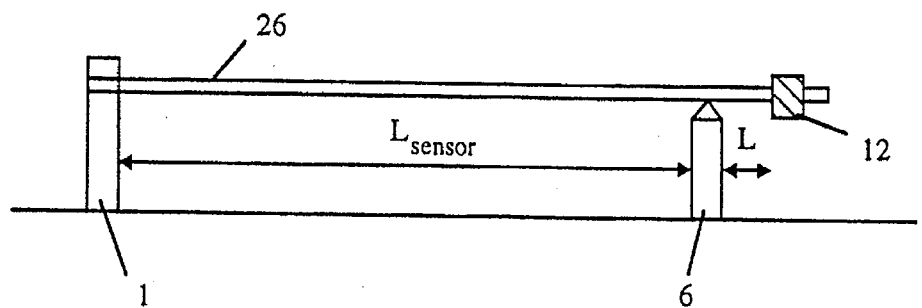
FIG. 1 is a block diagram of the sensor of the present invention.
Figure 2:
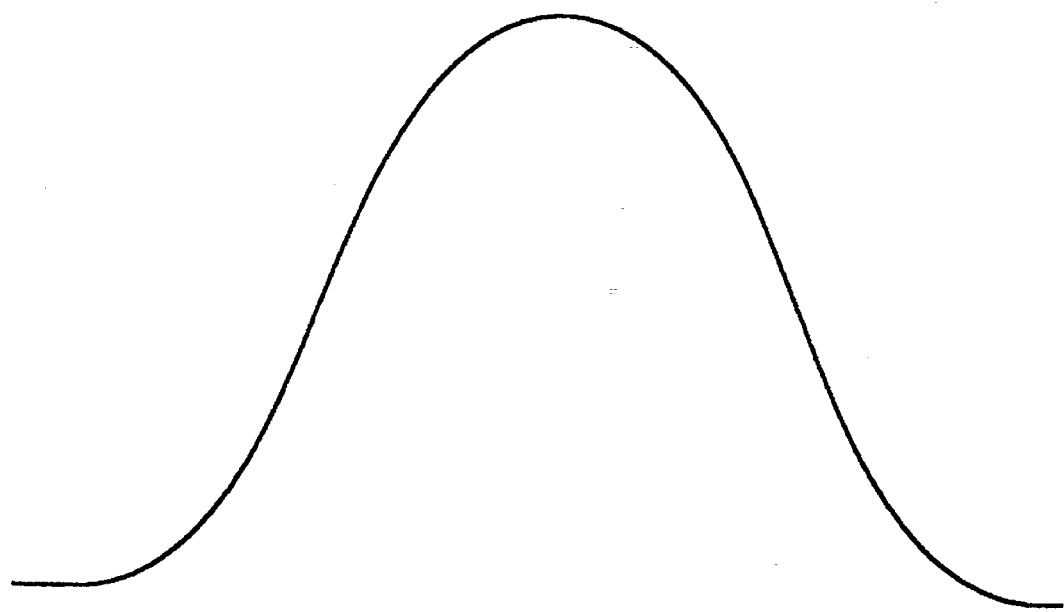
FIG. 2 is a graphical illustration of an optical fiber configuration of the invention.

The basic concept of the invention is presented in FIGS. 1 through 3. An extension rod 26 is firmly connected to a holder 1. The rod can move with respect to a guide 6, which only allows motion of the rod in the direction of the rod axis. The holder and guide are firmly secured to an underlying surface the strain displacement of which is to be measured. A rider 12 is mounted at a distance L from the guide on the rod. If the distance $L_{sensor}$ between the holder and the guide changes due to strain changes the system experiences, this change is reflected as a change in the length L. The sensor then measures the distance between the guide 6 and the rider 12. Rod 26 should preferably be made of a material which is thermally matched to the underlying surface to reduce or eliminate thermal apparent strain.

Figure 3A:
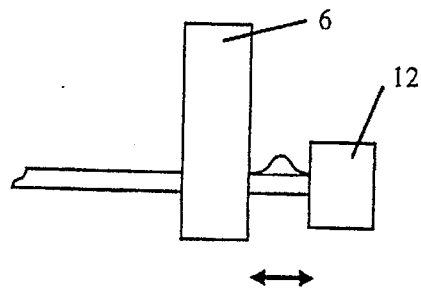
FIGS. 3a and 3b, is a representation of two alternative sensor installation configurations.
Figure 3B:
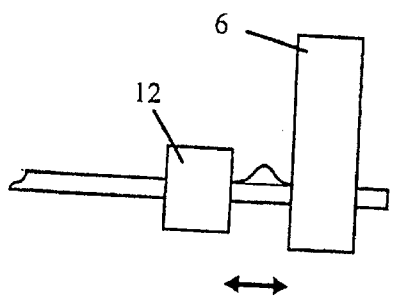

The fiber optic sensors used herein operate on the principle of curvature loss in bent fibers. The sensors take advantage of the specific shape the sensor assumes upon changing the distance between the two attachment points as seen in FIG. 2. As shown in FIGS. 3a and 3b, the relative position of rider 12 and guide 6 determines whether the sensor fiber is compressed (FIG. 3b) with movement of rod 26 or extended (FIG. 3a) with movement of rod 26.

While the left figure (FIG. 3a) indicates the setup as indicated above (the distance between the guide 6 and the rider 12, shown by the arrow, decreases when the distance between the holder 1 and the guide increases), the right figure (FIG. 3b) shows a setup (rider is mounted between the guide and the holder) where the distance indicated by the arrow increases when the guide and the holder separate.

Figure 4:
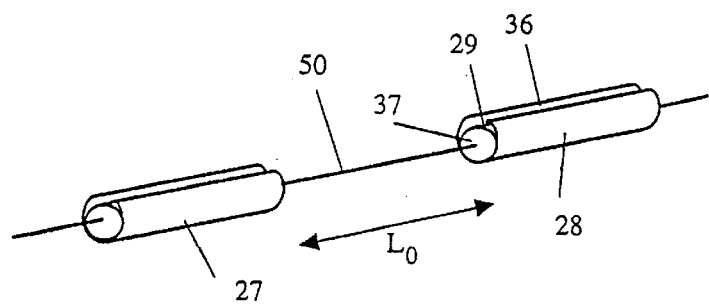
FIG. 4 is a highly enlarged view of the sensing portion of the fiber.

Prior to installation of the sensor, means need to be provided whereby one can securely hold onto the fiber without compressing it, which would result in mechanical stress and/or an induced loss. We do this by employing stainless steel sleeves that allow holding the fiber without compression. Specifically, FIG. 4 shows how fiber 50 is attached to expansion pins 27 and 28 whose inner diameter is larger than the outer diameter of the optical fiber. The fiber is inserted into the pins through slit 36, and then cemented into place using high temperature epoxy 29 which is inserted into the expansion pin using a syringe and needle. The high surface tension of the epoxy ensures that the front surface 37 is perpendicular to fiber 50. The two pins 27 and 28 are mounted facing each other with a typical mutual distance $L_o$ of 15 mm. The epoxy is cured and the sensor portion of the fiber is annealed to relieve strains. After fabrication, the sensors can be wound onto standard spools and are easily transported.

Figure 5:
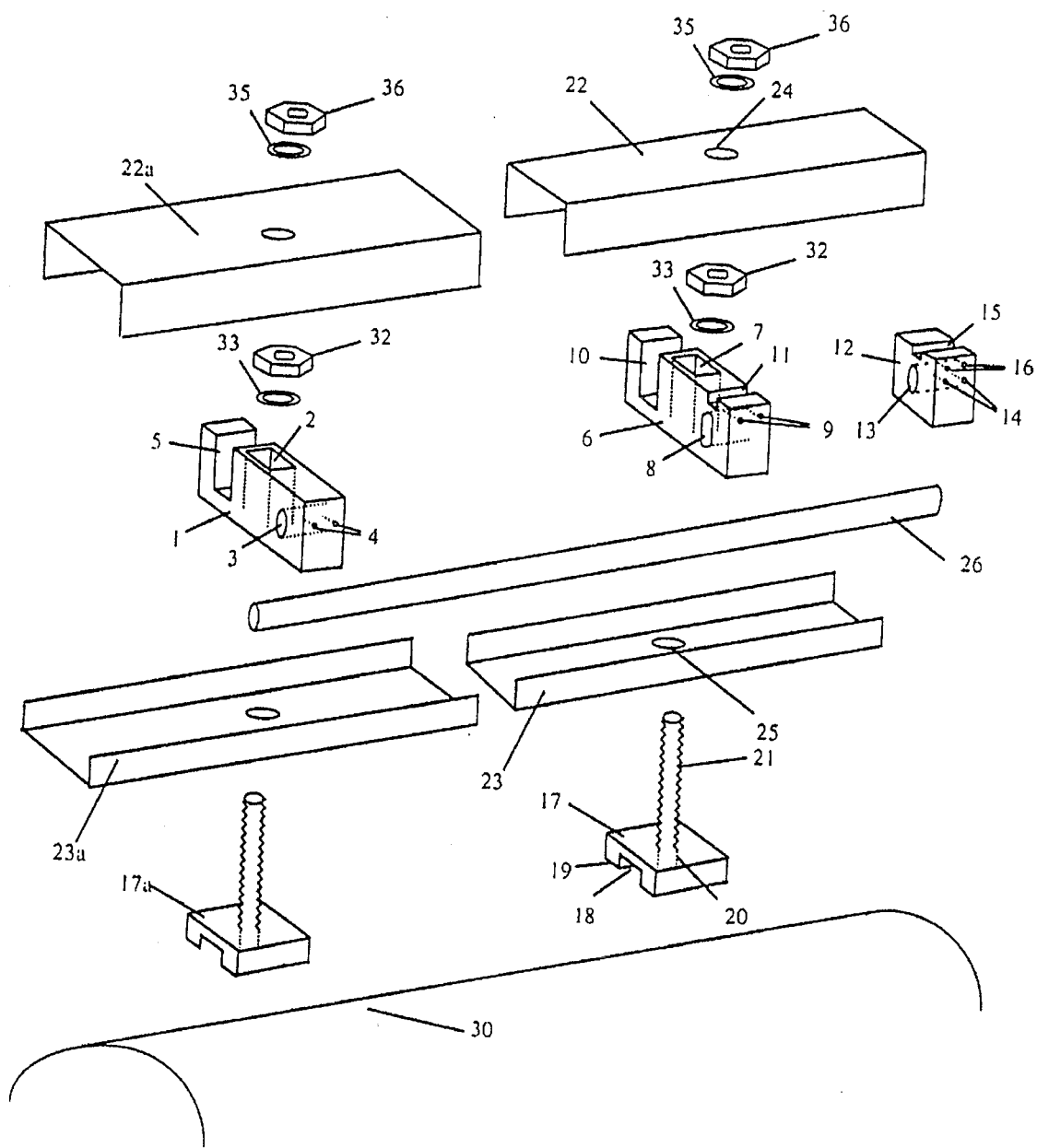
FIG. 5 is an exploded view of a preferred embodiment of the invention.
Figure 11A:
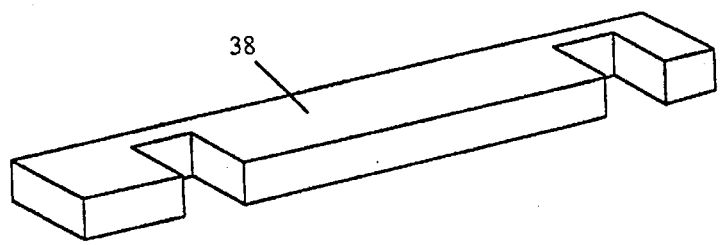
FIG. 11, comprising FIGS. 11a through 11c, provides three-dimensional views of various tools that may be used to aid in installing the invention.
Figure 11B:
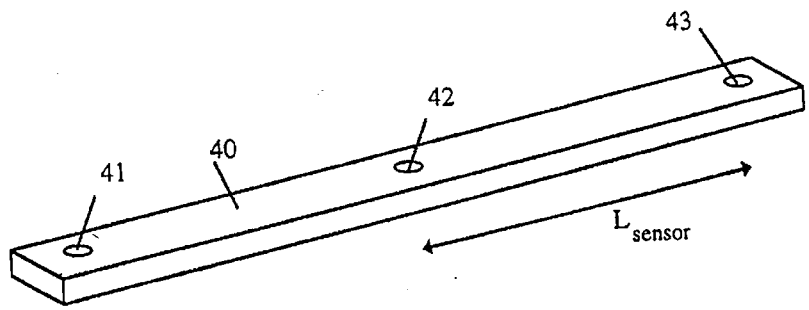
Figure 11C:
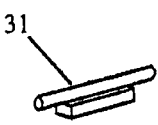

The installation of the high temperature sensor of the present invention will now be described in conjunction with FIGS. 5, 6 and 11. As shown in FIG. 5, a wide, shallow slot 18 is cut into a pair of attachment blocks 17 and 17a, so that the surfaces 19 will be able to contact the pipe 30 with a maximal area. Holes 20 are threaded into the blocks 17 and 17a, and screws 21 are inserted and welded into place in each block.

Figure 6A:
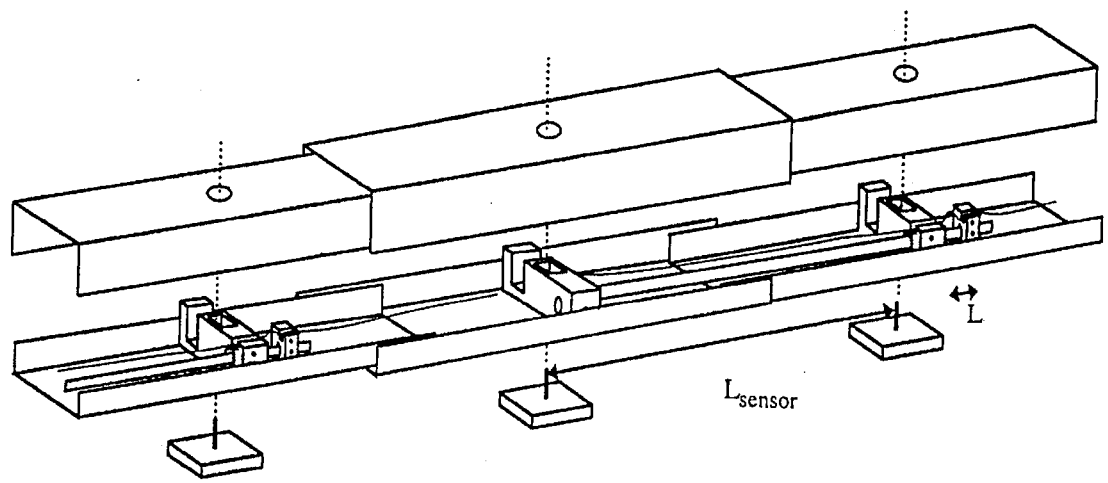
FIGS. 6a and 6b, is a partially exploded view of the preferred embodiment of FIG. 5 shown partially assembled.
Figure 6B:
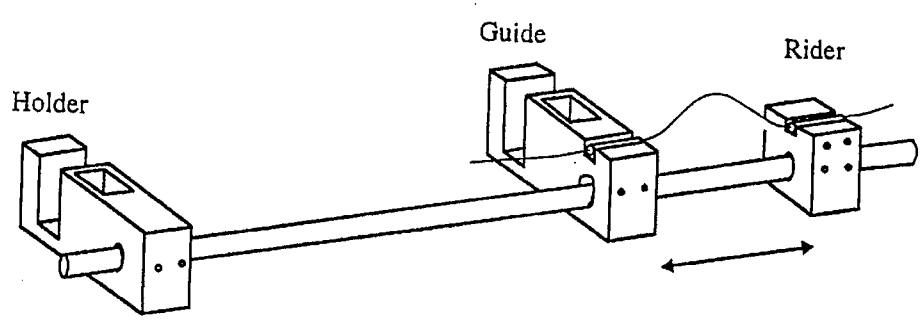

Holders 1, guides 6 and riders 12 are preferably made of stainless steel No. 316 and configured as shown in FIG. 6b. Even though rod passage or hole 8 is larger in diameter than rod passage or hole 3, care is taken to ensure that the bottom of hole 8 is at the same height as the bottom of hole 3, taking into account the thickness of bottom tray 23. This will ensure that rod 26 lies parallel to pipe 30. Top and bottom trays 22 and 23 are bent and holes 24 and 25 are drilled.

As shown in FIG. 5, during assembly in the field, attachments 17 and 17a are spaced at pre-determined distances using bar 40 (of FIG. 11b) which has 3 holes (41, 42 and 43) drilled into it at appropriate locations. The attachments are then welded onto the pipe 30 at the surfaces 19. Bar 40 is moved forward by one screw and the next attachment is positioned and welded. The lower protection trays 23 and 23a are placed alternately over the attachments by inserting screws 21 into holes 25. The difference in size of trays 23 and 23a allows the two attachments to move with respect to each other. At the same time, the trays provide protection against physical disturbances, act as a heat shield and ensures radiative equilibrium between pipe 30 and the sensor.

Holder 1 is placed onto attachment 17a by inserting screw 21 into hole 2. Guide 6 is placed onto attachment 17 by inserting screw 21 into hole 7. Both guide and holder are aligned with respect to each other using the alignment tool 38 (see FIG. 11a) and secured to the attachment screws using washer 33 and nut 32.

The extension rod 26 is inserted through hole 3 in the holder 1 and pushed through hole 8 in the guide 6. It is preliminarily held in place by setscrews 4 in the holder. Rider 12 is mounted on the rod 26 so that the distance between it and guide 6 is exactly 15 mm, as is ensured by spacer 31 (see FIG. 11c). The slots 11 and 15 are thus aligned, and the rider is secured in place by set screws 14.

Next, the sensor is positioned in a fully extended configuration by laying expansion pin 27 into slot 11 and expansion pin 28 into slot 15. Lead in fiber and all other fibers not used for this particular sensor are routed through slots 5 and 10 in the holder and guide, respectively.

The sensor is then brought into optimal performance range by loosening setscrews 4 of holder 1 and moving rod 26 so that rider 12 is brought closer to guide 6 and then tightening set screws 4. This will ensure that the fiber 50 is brought into the characteristic shape of FIG. 2 corresponding to a macrobend fiber optic displacement sensor. The system is closed by alternately placing the upper covers 22 and 22a onto the assembly and securing them into place using washer 35 and nut 36.

Bottom traps 23 and 23a and top trays 22 and 22a are preferably stainless steel No. 316 and are configured to overlap and slide relative to one another. The overlap provides protection against external influences and the sliding allows unrestricted motion.

A view of the assembled system is presented in FIG. 6a, wherein the upper covers 22 and 22a are shown lifted to reveal the installed sensor. A portion of an adjacent sensor is also shown.

As assembled, the sensor part of the system is as depicted in FIG. 6b. If the distance between holder 1 and guide 6 is reduced, the distance between guide 6 and rider 12 is increased, leading to a decrease in the loss of light through the fiber.

Note that the sensors still need to be calibrated individually, since variations in the manufacturing process introduce small but significant variations in sensor length and orientation of the fiber with respect to expansion pins 27 and 28. It is an important boundary condition of the invention that the fiber be centered and parallel with respect to the axis of pins 27 and 28.

The system may be monitored in a transmission mode where light is injected into the fiber using an available source (LED, laser, incandescent bulb) and necessary optics. Cladding modes are removed in a modestripper, and the output of the sensor is directed onto a photo detector. The sensor will change its transmission characteristics as a function of the shape that the fiber assumes. The shape is related to the distance $L_{sensor}$ between the attachment points. The output of the sensor onto the photo detector thus varies as a function of the length $L_{sensor}$. The system can also be monitored in reflection, which is the preferred embodiment.

Figure 10:
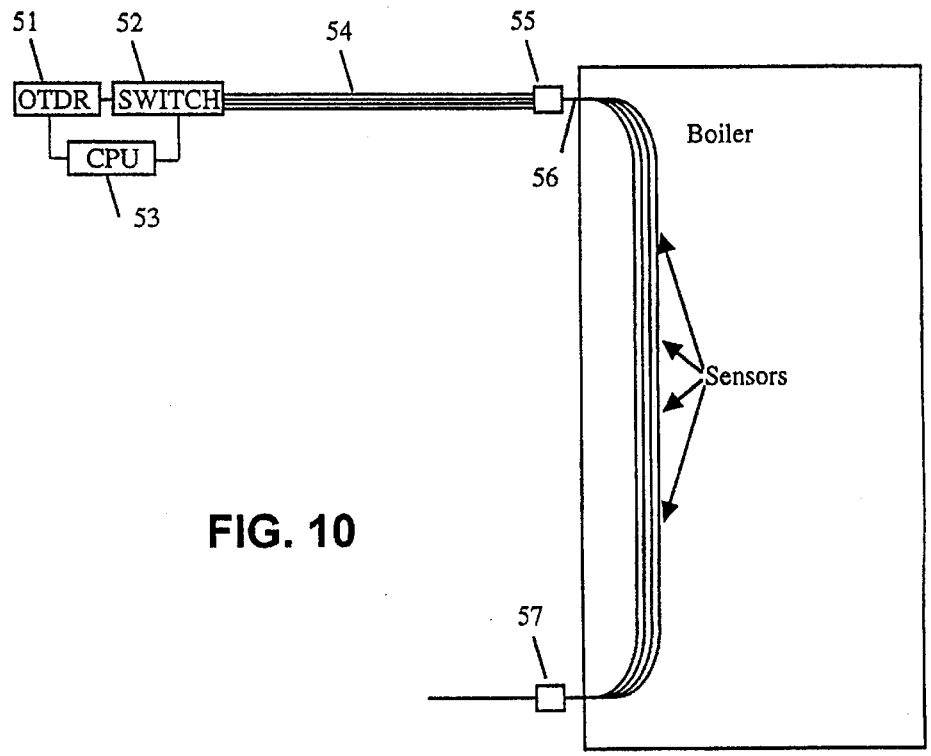
FIG. 10 is a block diagram of the measurement setup for accumulation of the data shown in FIGS. 7 and 8.

In reflection mode, the system is set up as indicated in FIG. 10. An Optical Time Domain Reflectomer (OTDR) 51 is connected to a 1-by-N switch 52 that allows addressing N fibers consecutively. Both the OTDR and the switch are under control by a computer 53, which determines which sensor is addressed and then stores the data. The signal is transmitted along a plurality of optical fibers 54 to a splice box 55, where it is injected into the gold-coated fibers 56. These gold-coated fibers are capable of withstanding the harsh environment inside a boiler or other high temperature or corrosive environment. The sensors are mounted inside the boiler on the different fibers. The gold-coated fibers exit the boiler and are connected to a splice box 57 from where the signal is removed using conventional fiber in order to ensure that Fresnel reflections off the back end of the gold-coated fiber do not contaminate the signal. OTDR data are presented below.

Typical distances from OTDR to the sensor are on the order of 100 m. OTDR measurements allow for spatial resolution of the signal along the length of the fiber, which is something transmission measurements cannot do. OTDR measurements suffer from small signal-to-noise ratios so that one has to average for long times (typical data acquisition times are on the order of 30 seconds per sensor). Transmission measurements can be faster, and have a greater dynamic range of signal, but cannot provide spatial resolution.

Figure 7A:
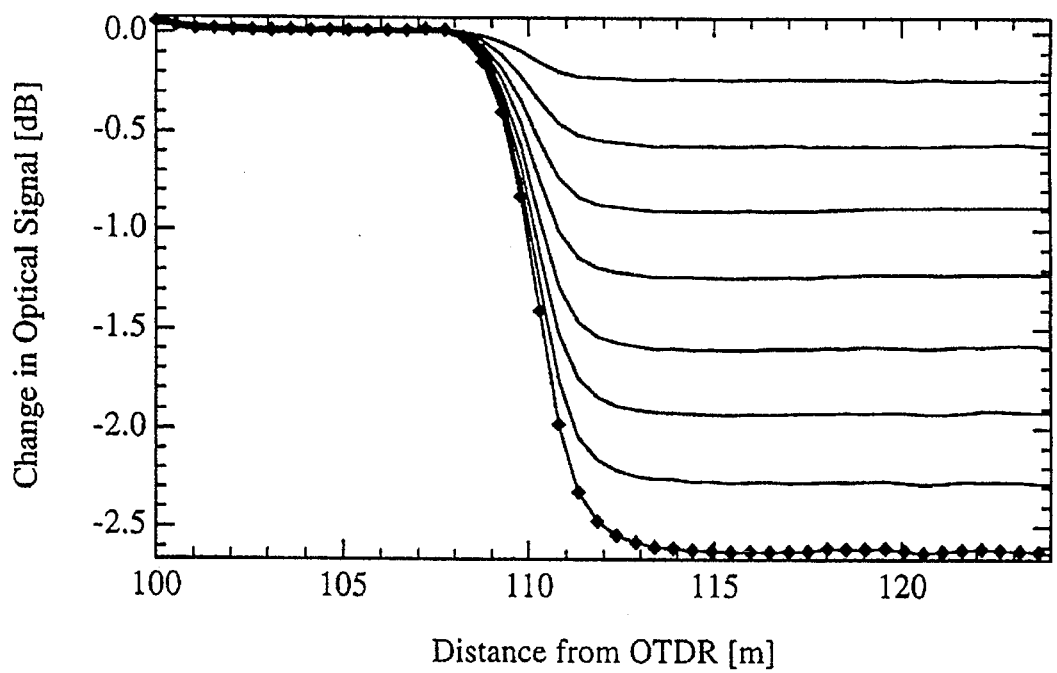
FIGS. 7a and 7b, is a graphical representation of OTDR data measurements.
Figure 7B:
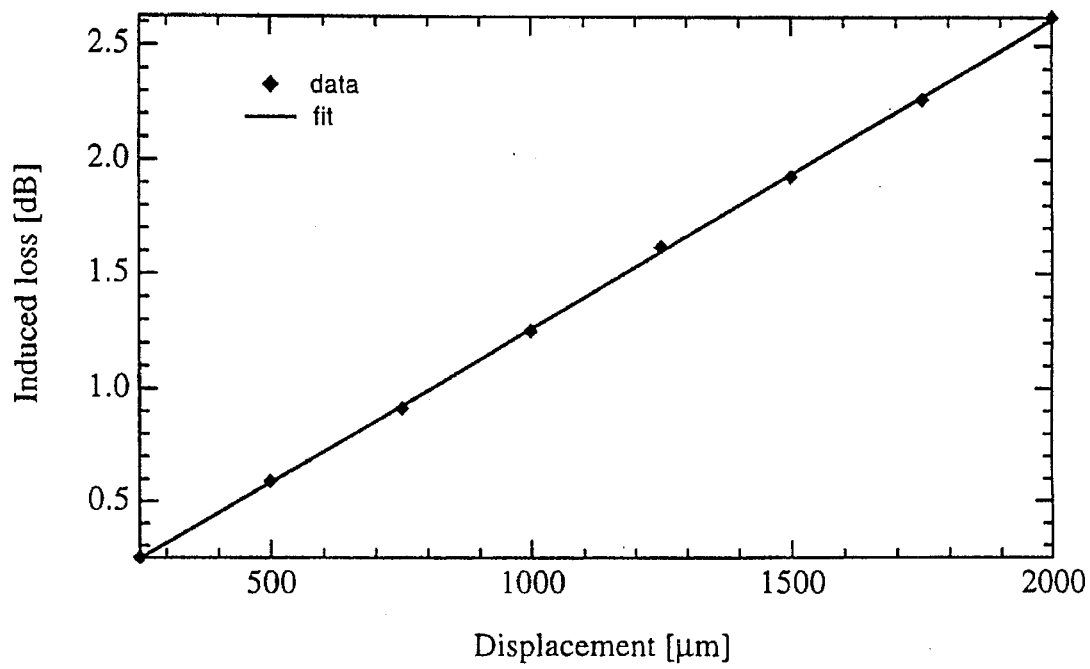
Figure 8A:
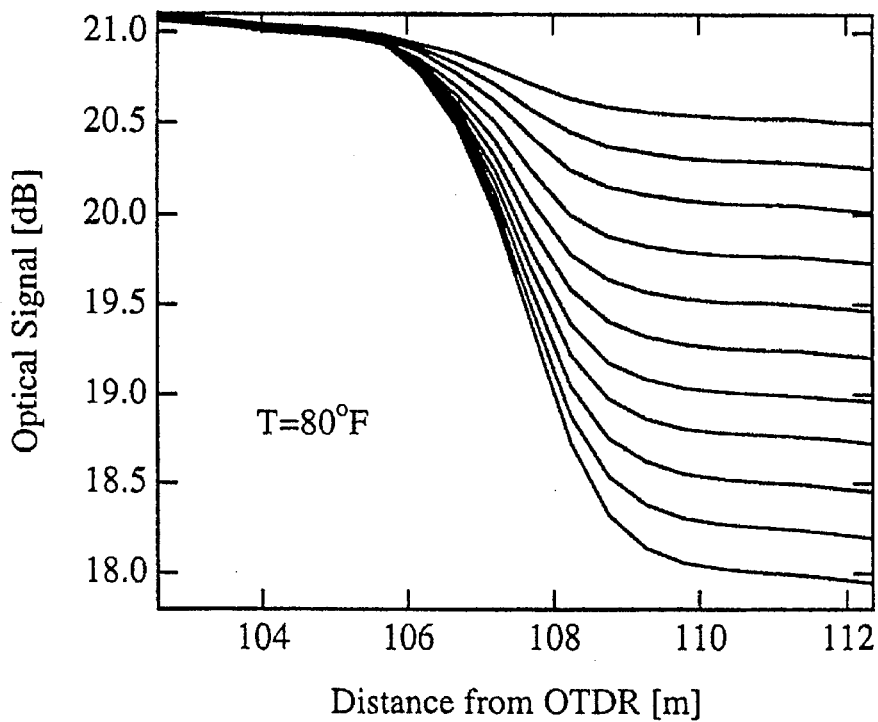
FIGS. 8a through 8f, is a graphical representation of OTDR data measurements at various temperatures.
Figure 8B:
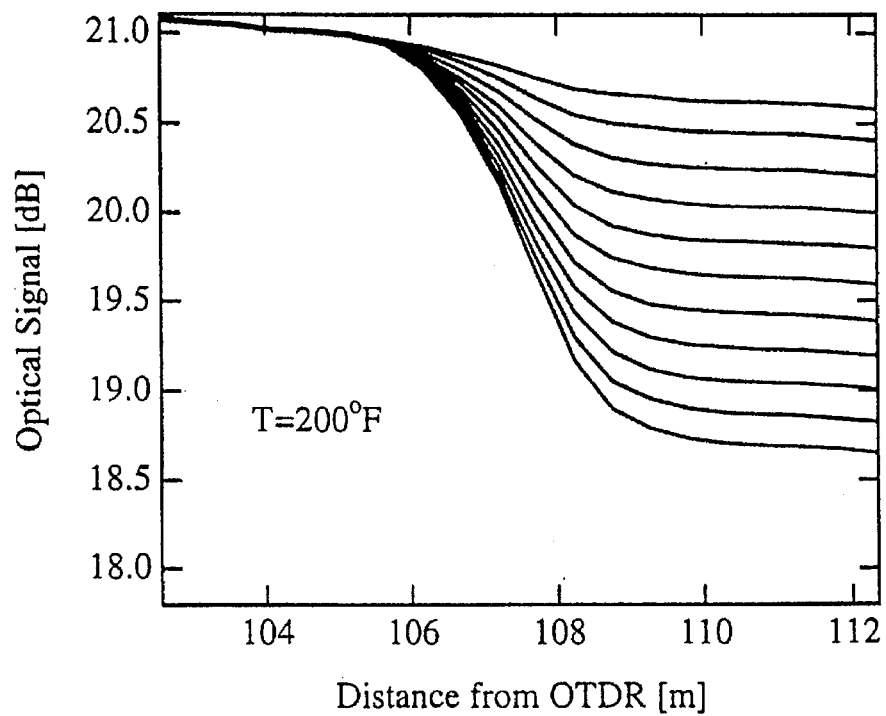
Figure 8C:
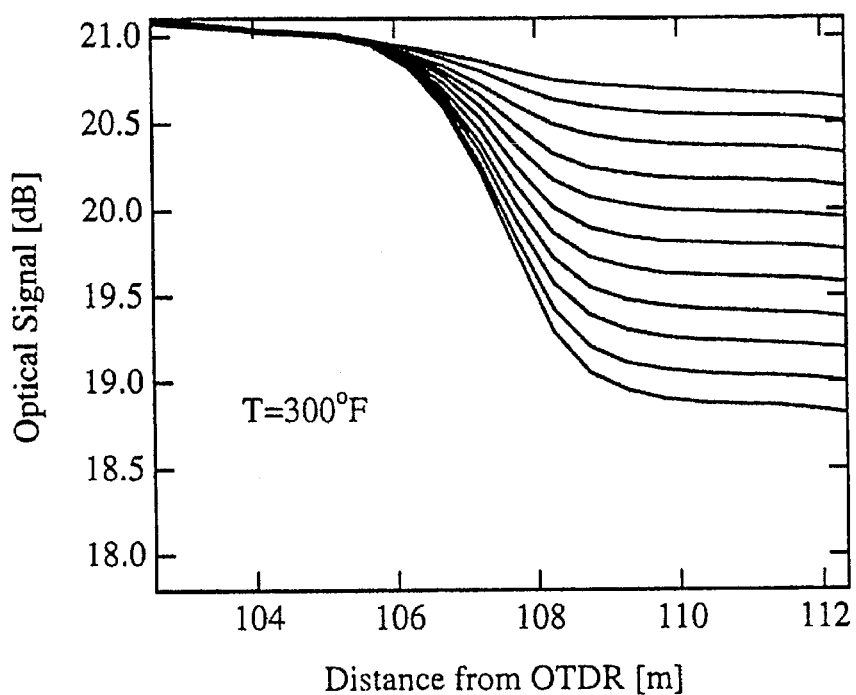
Figure 8D:
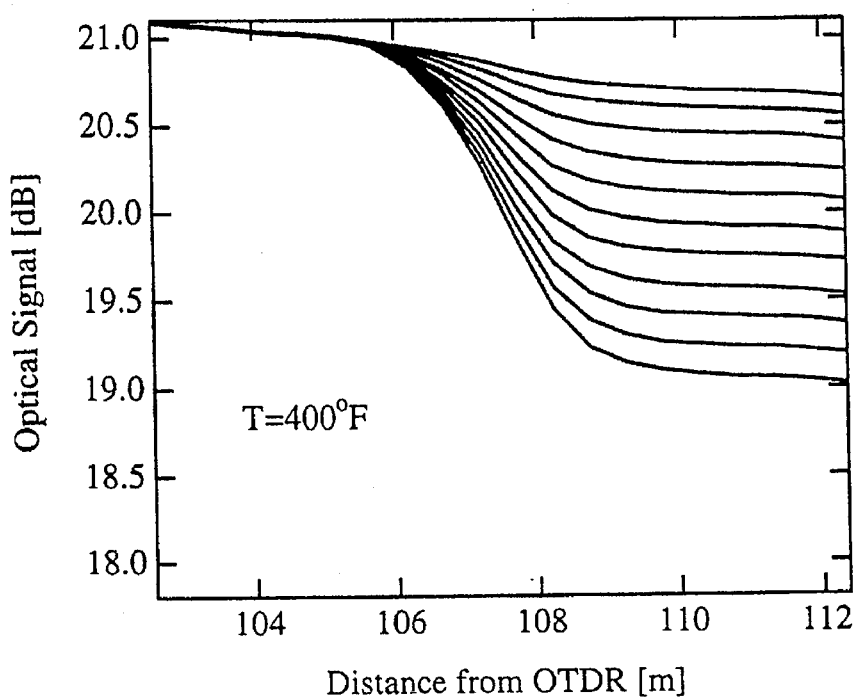
Figure 8E:
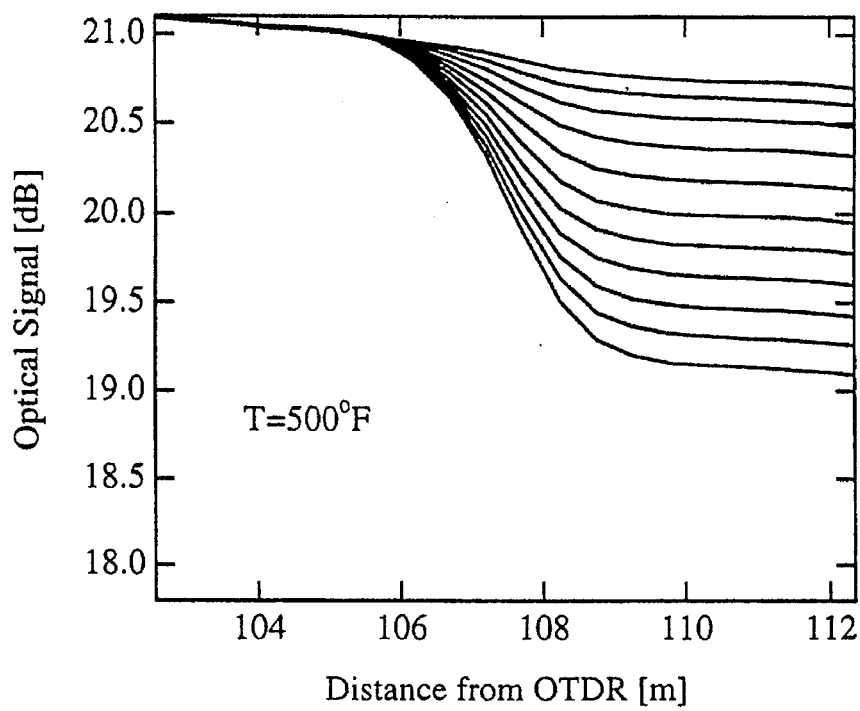
Figure 8F:
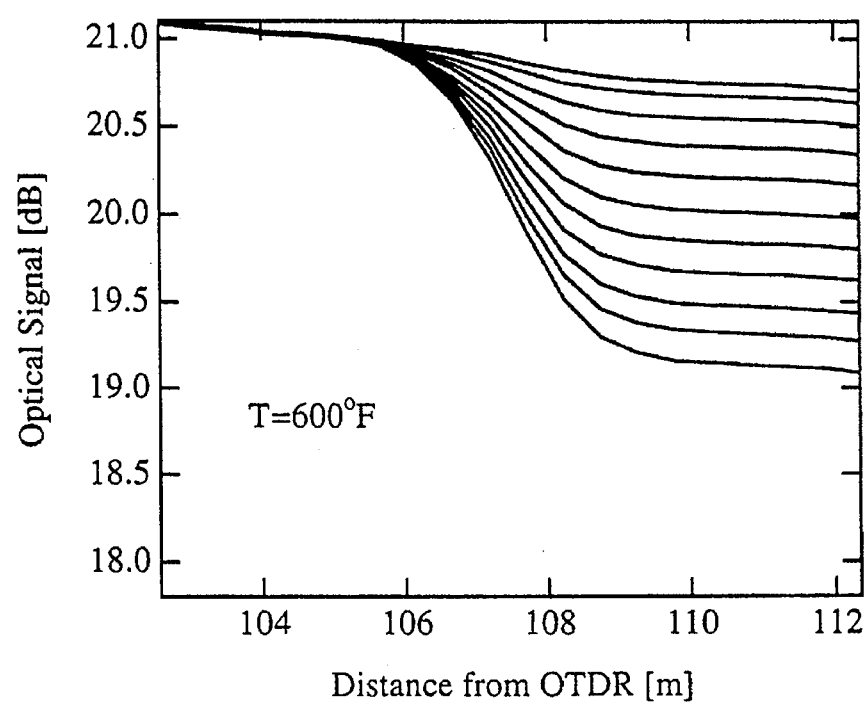

OTDR results as a function of displacement are presented in FIG. 7 for a sensor made using a 50 μm core diameter, a 125 μm cladding diameter, 10 μm gold coated graded index multi-mode fiber and having $L_o$=15 mm. FIG. 7a illustrates how the measured loss of a sensor changes if the distance between the expansion pins 27 and 28 is decreased in steps of 250 μm. The left hand scale is the change in optical signal in dB. The bottom axis is measured in meters from the OTDR instrument. A plot of the induced loss vs. the amount of displacement is presented in FIG. 7b. A fit reveals that the signal changes linearly by 1.35 mdB/μm. OTDR machines are capable of resolving at least 0.01 dB (10 mdB), so that changes on the order of 10 μm can be measured.

Figure 9A:
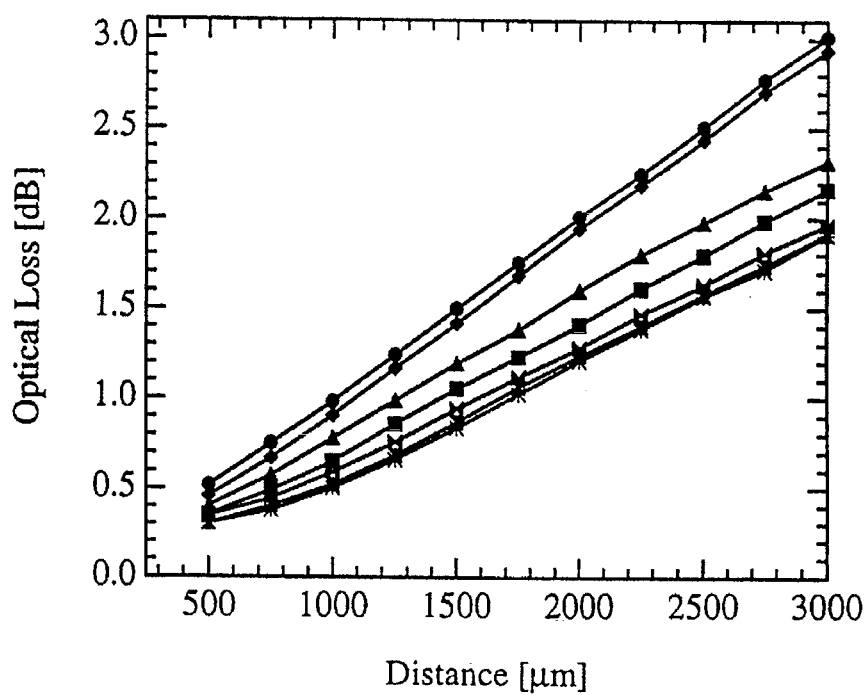
FIG. 9, which comprises FIGS. 9a and 9b, provide graphical summaries of the data shown in FIGS. 8a through 8f.
Figure 9B:
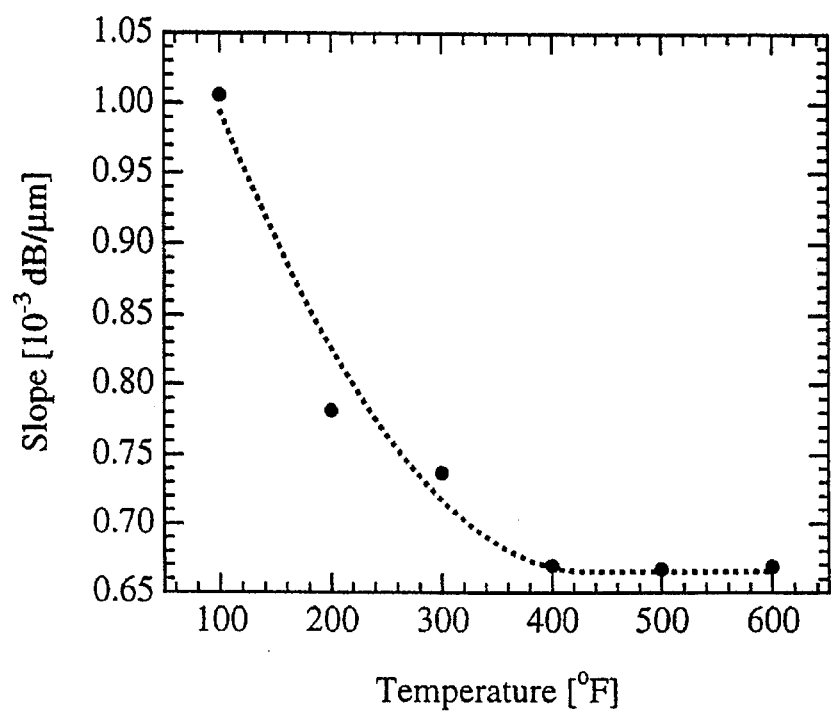

The temperature dependence of the system is shown in FIG. 8, which presents data similar to FIG. 7, except that the ambient temperature was raised to various higher temperatures up to 600 degrees Fahrenheit and $L_o$ is equal to 10 mm. FIG. 9 provides graphical summaries of the data of FIG. 8 and illustrates the temperature dependence of the sensor response. FIG. 9a shows the loss versus displacement (distance) for the same temperatures shown in FIG. 8 and FIG. 9b shows the variation in slope as a function of temperature. FIG. 9 confirms that above approximately 500 degrees Fahrenheit, the temperature dependence of the sensitivity becomes very small and can be neglected within the noise levels of the signal. We have tested the system up to 1200 degrees Fahrenheit without noticing any unusual change in the sensitivity.

For this specific sensor, the slopes of the signal vs. displacement curve change in a nearly linear fashion from 1.01 mdB/μm at 80 degrees Fahrenheit to 0.67 mdB/μm for temperatures above 500 degrees Fahrenheit.

Those having skill in the art to which the present invention pertains will as a result of the Applicants' teaching herein, now perceive various modifications and additions which may be made to the present invention. By way of example, the specific structural features of the preferred embodiment disclosed herein may be readily altered to retain the heat-resistant characteristics of the sensors while providing alternative means for connecting the sensors to an underlying substrate. Accordingly, all such modifications and additions are deemed to be within the scope of the invention which is to be limited only by the claims appended hereto and their equivalents.

We claim:

1. A strain sensor for measuring the strain of a surface at elevated temperatures, the sensor comprising:

an elongated member having a first end connected to said surface for movement therewith along a selected direction, and having a second end free to move relative to said surface along said selected direction;

a reference connection affixed to said surface closer to said second end of said member that to said first end;

a sensor device positioned between said reference connection and said second end and exhibiting at least one measurable characteristic responsive to the distance between said reference connection and said second end;

wherein said sensor device comprises a fiber optic displacement device;

wherein said fiber optic displacement device comprises an arcuate length of optical fiber configured for varying the relative magnitude of light transmission therethrough according to the degree of bending said fiber.

2. The sensor recited in claim 1 wherein said fiber is coated in metal.

3. The sensor recited in claim 2 wherein said metal is gold.

4. The sensor recited in claim 1 wherein said member and said sensor device are enclosed within a heat resistant material housing.

5. The sensor recited in claim 4 wherein said heat resistant material is stainless steel No. 316.

6. The sensor recited in claim 1 wherein said selected direction is parallel to the elongation of said member.

7. The sensor recited in claim 1 wherein said fiber is held at a selected angle and location between said reference connection and said second end without compression of said fiber.

8. The sensor recited in claim 1 wherein said elongated member comprises a metal rod having a coefficient of thermal expansion that is substantially matched to the coefficient of thermal expansion of said surface.

9. A strain sensor for measuring the strain of a surface at elevated temperatures, the sensor comprising:

an elongated member having a first end connected to said surface for movement therewith along a selected direction, and having a second end free to move relative to said surface along said selected direction;

a reference connection affixed to said surface closer to said second end of said member than to said first end;

a sensor device positioned between said reference connection and said first end and exhibiting at least one measurable characteristic responsive to the distance between said reference connection and said first end;

wherein said sensor device comprises a fiber optic displacement device;

wherein said fiber optic displacement device comprises an arcuate length of optical fiber configured for varying the relative magnitude of light transmission therethrough according to the degree of bending said fiber.

10. The sensor recited in claim 9 wherein said fiber is coated in metal.

11. The sensor recited in claim 10 wherein said metal is gold.

12. The sensor recited in claim 9 wherein said member and said sensor device are enclosed within a heat resistant housing.

13. The sensor recited in claim 9 wherein said selected direction is parallel to the elongation of said member.

14. The sensor recited in claim 9 wherein said fiber is held at a selected angle and location between said reference connection and said first end without compression of said fiber.

15. The sensor recited in claim 9 wherein said elongated member comprises a metal rod having a coefficient of thermal expansion that is substantially matched to the coefficient of thermal expansion of said surface.

16. A strain sensor for measuring the strain of a surface at elevated temperatures, the sensor comprising:

a rod attached to said surface at a first location by a holder;

a guide attached to said surface at a second location spaced from said first location and having an aperture for slidably receiving said rod;

a rider affixed to said rod at a point closer to said second location than to said first location; and a fiber optic displacement sensor device positioned between said guide and said rider for providing a measurement of the distance therebetween.

17. The sensor recited in claim 16 wherein said fiber optic displacement device comprises an arcuate length of optical fiber configured for varying the relative magnitude of light transmission therethrough according to the degree of bending said fiber.

18. The sensor recited in claim 17 wherein said fiber is coated in metal.

19. The sensor recited in claim 18 wherein said metal is gold.

20. The sensor recited in claim 16 wherein said rod and said sensor device are enclosed within a heat resistant material housing.

21. The sensor recited in claim 16 wherein the thermal expansion coefficient of said rod is substantially equal to the thermal expansion coefficient of said surface.

22. The sensor recited in claim 16 wherein said measurement of distance is provided by means for determining the light transmission loss through said sensor.

23. The sensor recited in claim 22 wherein said determining means comprises a source of light and a detector at opposite ends of said sensor.

24. The sensor recited in claim 22 wherein said determining means comprises a source of light and detector, both at one end of said sensor.

* * * * *